(12) United States Patent
Bensberg et al.

(10) Patent No.: US 9,817,856 B2
(45) Date of Patent: Nov. 14, 2017

(54) DYNAMIC RANGE PARTITIONING

(71) Applicants: Christian Bensberg, Heidelberg (DE);
Jochen Becker, Haseluenne (DE);
Carsten Mueller, Bruschal (DE);
Andreas Thumfart, Heidelberg (DE)

(72) Inventors: Christian Bensberg, Heidelberg (DE);
Jochen Becker, Haseluenne (DE);
Carsten Mueller, Bruschal (DE);
Andreas Thumfart, Heidelberg (DE)

(73) Assignee: SAP SE, Walldorf (DE)

( * ) Notice: Subject to any disclaimer, the term of this patent is extended or adjusted under 35 U.S.C. 154(b) by 517 days.

(21) Appl. No.: 14/463,060

(22) Filed: Aug. 19, 2014

(65) Prior Publication Data
US 2016/0055192 A1 Feb. 25, 2016

(51) Int. Cl.
*G06F 17/30* (2006.01)
(52) U.S. Cl.
CPC .............. *G06F 17/30339* (2013.01)
(58) Field of Classification Search
CPC .................................. G06F 17/30339
USPC ........................... 707/696; 711/173
See application file for complete search history.

(56) References Cited

U.S. PATENT DOCUMENTS

| | | | |
|---|---|---|---|
| 6,609,131 B1 * | 8/2003 | Zait | G06F 9/5066 707/3 |
| 7,103,590 B1 * | 9/2006 | Murthy | G06F 17/30483 707/3 |
| 7,447,679 B2 | 11/2008 | Shankar et al. | |
| 7,472,107 B2 | 12/2008 | Agrawal et al. | |
| 7,681,011 B1 * | 3/2010 | Shmuylovich | H04L 67/1097 711/114 |
| 7,765,246 B2 | 7/2010 | Basu et al. | |
| 7,917,512 B2 | 3/2011 | Bhide et al. | |
| 8,364,677 B2 | 1/2013 | Brodfuehrer et al. | |
| 8,620,888 B2 | 12/2013 | Basu et al. | |
| 2012/0246158 A1 | 9/2012 | Ke et al. | |

* cited by examiner

*Primary Examiner* — Chelcie Daye
(74) *Attorney, Agent, or Firm* — Buckley, Maschoff & Talwalkar LLC

(57) ABSTRACT

A system includes generation of a definition of a table including a partitioning column of the table and a threshold size, allocation of a first memory partition for the table, determination that a size of the records of the table in the first memory partition is greater than the threshold size, and, in response to the determination that the size of the records of the table in the first memory partition is greater than the threshold size, determination that a maximum value of the partitioning column in the records of the table in the first memory partition, determination of a minimum value of the partitioning column in the records of the table in the first memory partition, generation of metadata indicating that records of the table in which the value of the partitioning column is in a range between and including the minimum value and the maximum value are stored in the first memory partition, and allocation of a second memory partition for the table.

19 Claims, 7 Drawing Sheets

| Transaction_Number | Store_Number | Products | Total_Sale |
|---|---|---|---|
| 143188 | ~~~~~~~~ | ~~~~~~ | ~~~~~~ |
| 143189 | ~~~~~~~~ | ~~~~~~ | ~~~~~~ |
| 143190 | ~~~~~~~~ | ~~~~~~ | ~~~~~~ |
| | | | |

*FIG. 5*

| Transaction_Number | Store_Number | Products | Total_Sale |
|---|---|---|---|
| 143188 | ~~~~~~~~ | ~~~~~~ | ~~~~~~ |
| 143189 | ~~~~~~~~ | ~~~~~~ | ~~~~~~ |
| 143190 | ~~~~~~~~ | ~~~~~~ | ~~~~~~ |
| 143191 | ~~~~~~~~ | ~~~~~~ | ~~~~~~ |
| | | | |

*FIG. 6*

| Transaction_Number | Store_Number | Products | Total_Sale |
|---|---|---|---|
| 143188 | ~~~~~~~~ | ~~~~~~ | ~~~~~~ |
| 143189 | ~~~~~~~~ | ~~~~~~ | ~~~~~~ |
| 143190 | ~~~~~~~~ | ~~~~~~ | ~~~~~~ |
| 143191 | ~~~~~~~~ | ~~~~~~ | ~~~~~~ |
| 143192 | ~~~~~~~~ | ~~~~~~ | ~~~~~~ |
| | | | |

*FIG. 7*

DYNAMIC RANGE PARTITIONING

BACKGROUND

Modern database systems store large amounts of electronic data. This data may be received at regular intervals or substantially continuously. The stored data may be accessed for reporting and/or analytical purposes. The sheer amount of data often creates a significant burden on storage and processing systems.

Many techniques have been developed to alleviate this burden. In one example, stored data is apportioned among separate physical memory areas, or partitions. A partition may store related data, such that processing requires interaction with a single or a small number of partitions. This arrangement may also provide simple deletion of old data, by dropping a partition which stores the old data.

A developer or system administrator defines a location, a partition size and a partition content of a database partition, ideally prior to using the database partition. The size of the partition content (i.e., the size of data records which are to be stored in the database partition) is often unknown, so the developer will typically either define too large a partition size (resulting in unused storage capacity) or too small a partition size (resulting in error and/or ad-hoc increases in the partition size). These inefficiencies may be addressed by re-partitioning based on actual received data records, but re-partitioning results in a high system load and requires exclusive locks to move the data among the partitions.

BRIEF DESCRIPTION OF THE DRAWINGS

FIG. 5 is a tabular representation of a portion of a database table according to some embodiments.

FIG. 6 is a tabular representation of a portion of a database table according to some embodiments.

FIG. 7 is a tabular representation of a portion of a database table according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
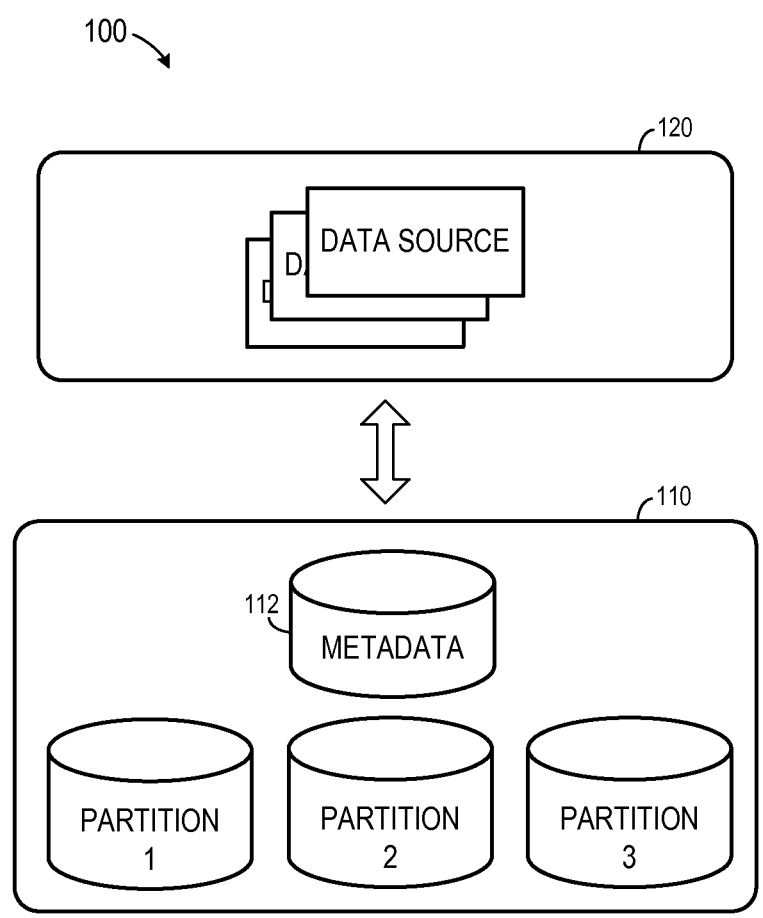
FIG. 1 is a block diagram of a system according to some embodiments.

FIG. 1 is a block diagram of system 100 according to some embodiments. System 100 includes database system 110 and data sources 120. Database system 110 stores data generated and/or collected by data sources 120 during the course of business.

Each of data sources 120 may comprise one or more computing systems, including other database systems. In one example, each of data sources 120 may comprise a computing system of a retail store and database system 110 may be a data warehouse which receives records therefrom, continuously or at regular intervals. FIG. 1 is non-exhaustive; embodiments may be implemented in any system which stores records into a database table.

Database system 110 of system 100 includes three partitions, but embodiments are not limited thereto. A partition is a logically-defined portion of physical memory. In some embodiments, database system 110 is implemented in Random Access Memory (e.g., cache memory for storing recently-used data) and one or more fixed disks (e.g., persistent memory for storing their respective portions of the full database). In such embodiments, each partition may consist of a respective single fixed disk. In another, each partition consists of more than one fixed disks. One fixed disk may hold two or more partitions, and each partition need not be of identical size.

Database system 110 may implement an "in-memory" database, in which volatile (e.g., non-disk-based) memory (e.g., Random Access Memory) is used both for cache memory and for storing its entire respective portion of the full database. Each partition in such a database may consist of one or more contiguous portions of volatile memory.

Metadata 112 may provide information regarding the structure, relationships and meaning of the data stored within database system 110. This information may be generated by a database administrator. According to some embodiments, metadata 112 includes data defining the schema and characteristics of each database table stored within database system 110. A schema of a database table may specify the name of the database table, columns of the database table, the data type associated with each column, and other information associated with the database table. According to some embodiments, a schema of a database table may specify whether the table should be dynamically partitioned as described herein and, if so, may indicate a partitioning column and a threshold size for use during such partitioning as will be described below.

In some embodiments, the data of database system 110 may comprise one or more of conventional tabular data, row-based data stored in row format, column-based data stored in columnar format, and object-based data. Database system 110 may also or alternatively support multi-tenancy by providing multiple logical database systems which are programmatically isolated from one another. Moreover, the data of database system 110 may be indexed and/or selectively replicated in an index to allow fast searching and retrieval thereof.

Figure 2:
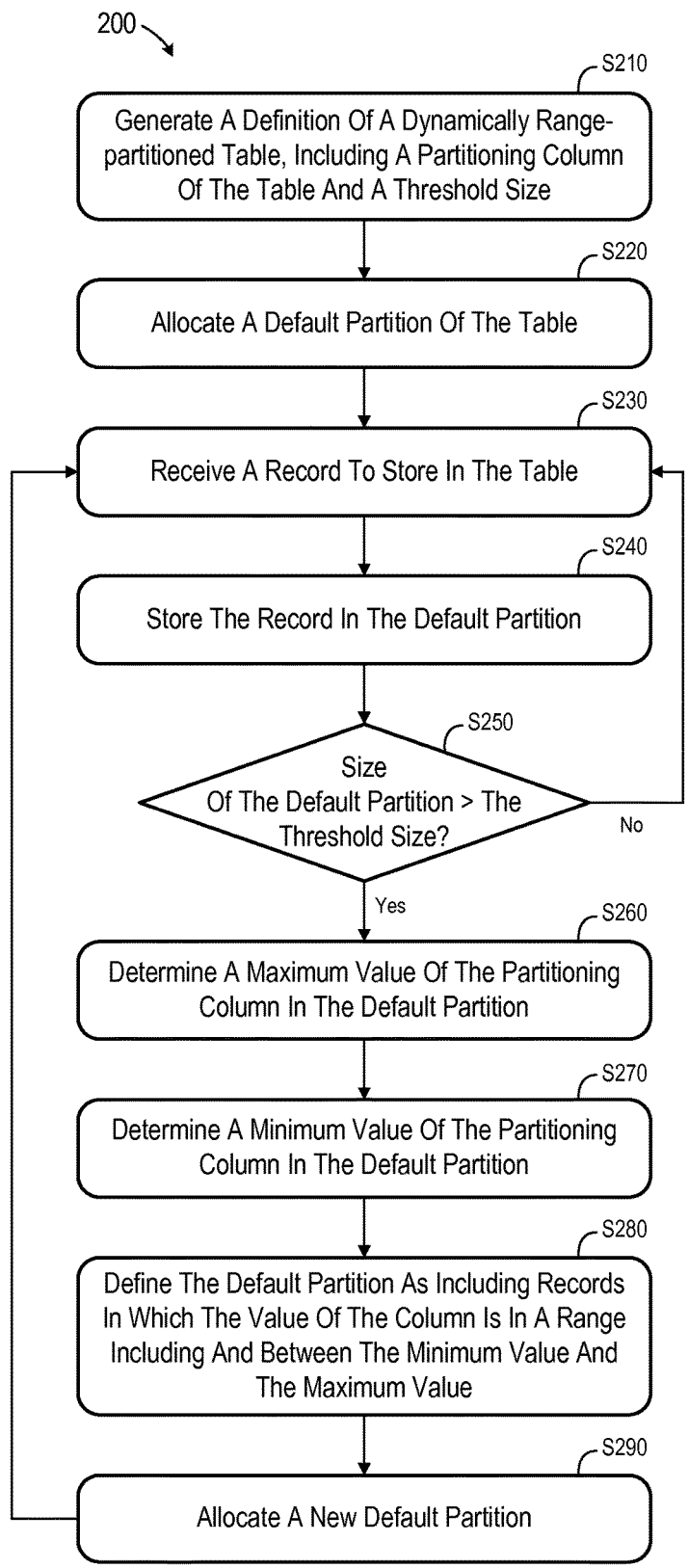
FIG. 2 is a flow diagram of a process according to some embodiments.

FIG. 2 comprises a flow diagram of process 200 according to some embodiments. In some embodiments, various hardware elements of database system 110 execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a definition of a dynamically range-partitioned table is generated. The definition includes a partitioning column of the table and a threshold size. The definition may be generated in metadata (e.g., metadata 112) during design of a database.

Figure 3:
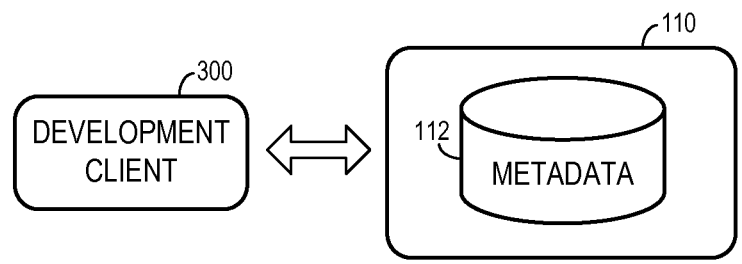
FIG. 3 is a block diagram of a development system according to some embodiments.

FIG. 3 illustrates a development environment according to some embodiments. As shown, a developer may operate development client 300 to create and edit metadata 112 of database system 110 in order to define tables which will stored and managed by database system 110 and the relations therebetween. The metadata generated at S210 may include a flag designating a table as a dynamically range-partitioned table.

The partitioning column is a column of the table based on which partitioning will be performed. In some embodiments, the partitioning column includes monotonously-growing values. In other words, each record received for storage in the table includes a value for the partitioning column, and the value is the same as or greater than the values in the partitioning column of all (or substantially all) previously-received table records. Examples of a partitioning column according to some embodiments include calendar_day and document_number. The threshold size indicates a desired size for each partition which stores the table. As will be described below, a new partition for storing new records is dynamically allocated once a current partition reaches the threshold size. This provides for efficient allocation of storage area.

After generation of the definition, a partition is allocated for the table at S220. According to some embodiments, the metadata of the table specifies the location of the allocated partition and indicates that records of the table are to be stored in the partition. The partition may consist of any combination of any portion of storage devices. In some embodiments, a particular number of fixed disk drives is allocated as the partition. The partition will initially be referred to as a "default" partition. As will be apparent from the following description, a default partition is a partition in which a record of the table is stored if a value of the partitioning column of the record is not within a range associated with any other partition in which records of the table are stored.

Figure 4:
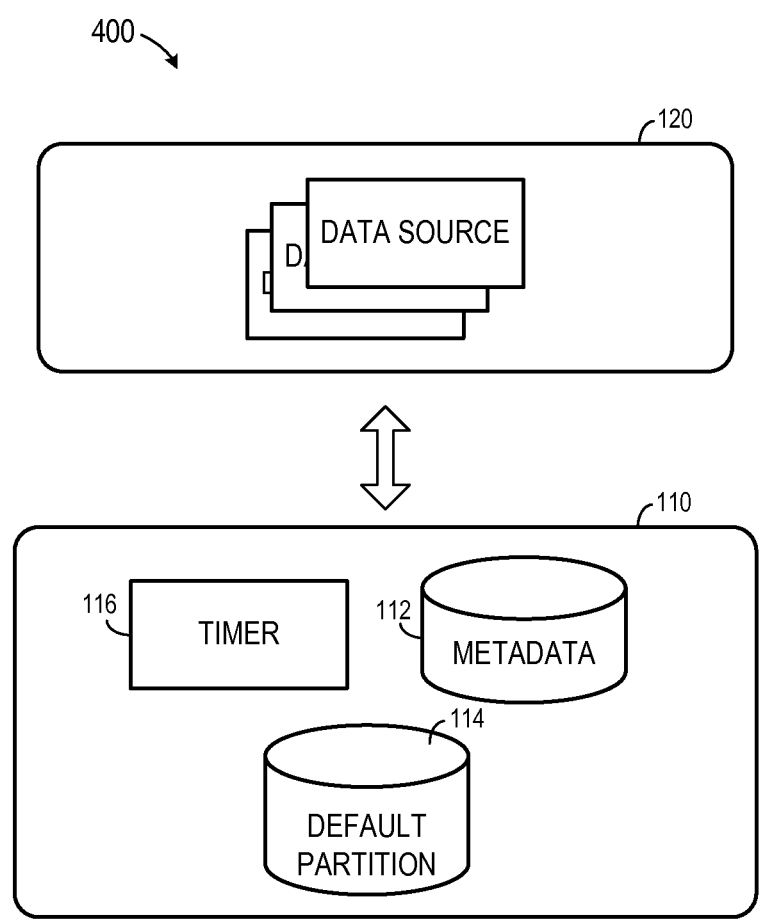
FIG. 4 is a block diagram of a runtime system according to some embodiments.

FIG. 4 illustrates system 400 according to some embodiments. The table definition is stored in metadata 112 and default partition 114 has been allocated within database system 110. Timer 116 may comprise processor-executable program code to provide some of the functionality described below. Next, at S230, a record to store in the table is received. The record may be received at S230 in a daily batch job, a continuous data feed, or in any other manner. The record may be locally- or remotely-generated. The record is stored in the default partition at S240 based on the table metadata. S230 and S240 are performed after S220, and may be performed by a database process operating in parallel with and independently of steps S250-S290.

At S250, it is determined whether the size of the default partition is greater than the threshold size. If not, flow returns to S230 to receive another record for storage in the table. Flow therefore cycles between S230 and S250 to store records in the table until it is determined at S250 that the size of the default partition is greater than the threshold size. The unit of size may be number of records, memory amount (e.g., gigabytes), or any other suitable unit of size.

New records are typically assigned to a current default partition. However, in a case that a record is received which includes a value of the partitioning column which is within a min-max range of a prior default partition, the record is stored in the prior default partition. The min-max range of a prior default partition will be described below. Accordingly, storage of a record at S250 may include a determination of the partition in which to store the record, based on the value of the partitioning column of the record.

As mentioned above, timer 116 may operate to perform the determination at S250 periodically and independently of the reception and storage of records. For example, another database process may be responsible for receiving table records at S230 and storing the table records in partitions at S240 based on metadata defining the tables and their allocated partitions. Timer 116 may execute in parallel to these processes, and perform the determination of S250 (as well as S260-S290) at particular intervals.

However, according to some embodiments, S250 is executed after storage of each record at S240. That is, S230 through S290 may be performed sequentially. FIG. 5 is a tabular representation of a portion of table 500 according to some embodiments. Table 500 is a dynamically range-partitioned according to some embodiments. Column Transaction_Number is the partitioning column. It will be assumed that the records shown in FIG. 5 were received and stored in a same default partition during successive executions of S230 and S240.

It will also be assumed that, at S250, timer 116 (or some other entity) determines that the partition storing table 500 (as shown in FIG. 5) is greater than the threshold size. Flow therefore proceeds to S260 to determine a maximum value of the partitioning column from the records stored in the default partition. In the FIG. 5 example, the maximum value is 143190. Next, flow proceeds to S270 to determine a minimum value of the partitioning column from the records stored in the default partition. In the FIG. 5 example, the minimum value is 143188. Timer 116 performs the determinations at S260 and S270 according to some embodiments.

Next, at S280, the default partition is defined as including records in which the value of the partitioning column is in a range including and between the maximum value and the minimum value. According to some embodiments, timer 116 issues a Data Definition Language (DDL) statement to generate metadata in metadata 114 indicating that records of the table in which the value of the partitioning column is in a range between and including 143188 and 143190 are stored in the current partition.

According to another example, it assumed that the metadata for the table currently defines ranges of two former default partitions in the following manner: "RANGE 1-10, 10-20, *". At S280, and assuming the minimum and maximum values of the partitioning column were determined to be "20" and "25", respectively, the metadata for the table is changed to "RANGE 1-10, 10-20, 20-26, *", thereby defining ranges for three partitions. This change indicates that an existing physical partition (i.e., the default partition, originally represented by "*") is re-interpreted with a defined range of 20-26. No data is moved. A new default partition for future data is also created, represented by the trailing "*". According to the syntax of this example, the upper bound of each partition (i.e., 10, 20 and 26) represents a value which is not included in the associated partition's records. Embodiments are not limited thereto, as the range of a partition may be specified in the metadata in any manner.

Figure 8:
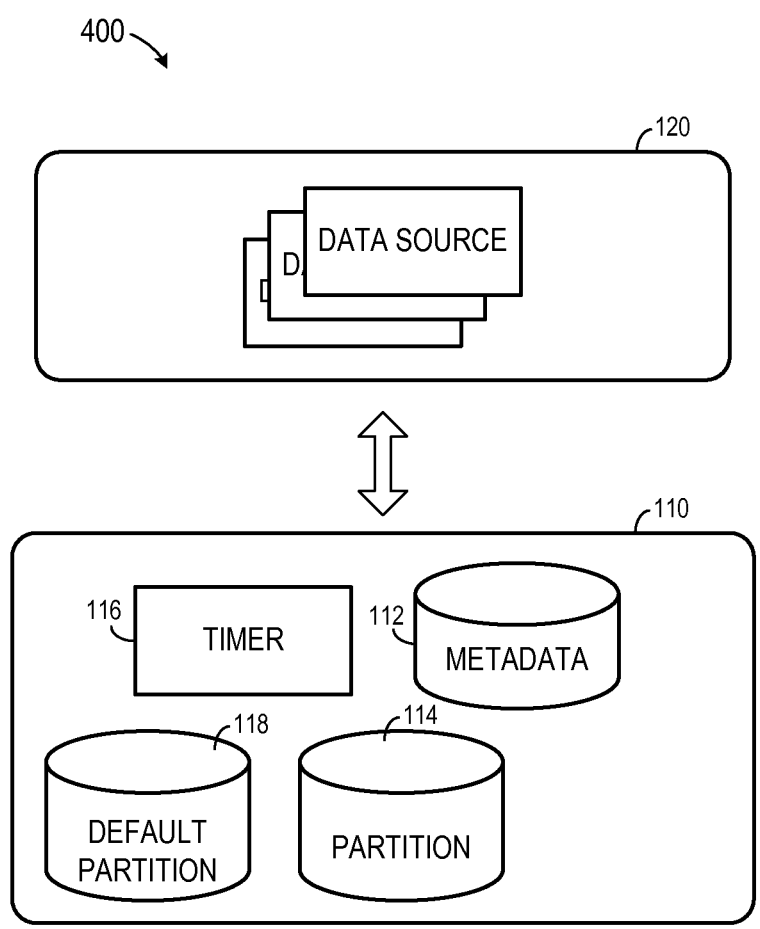
FIG. 8 is a block diagram of a runtime system according to some embodiments.

A new default partition is allocated at S290. Again, timer 116 may issue a DDL statement to generate metadata in metadata 114 which defines a location of a new partition and indicates that the new partition is the default partition. FIG. 8 shows system 400 after allocation of new partition 118. Partition 118 is indicated as the default partition and former default partition 114 is no longer designated as the default partition.

Flow then returns to S230 to receive a new record and to store the new record at S240. FIG. 6 illustrates storage of a new record in table 500. The value of the partitioning column in the new record is not within the range associated with the prior default partition (or the range associated with any prior default partition), so the new record is stored in the current default partition at S240.

As described above, flow continues to cycle between S230 and S250 to receive records (see, e.g., FIG. 7) and store them in the current default partition. Once it is determined at S250 that a size of the current default partition is greater than the threshold size, maximum and minimum values are again determined at S260 and S270, and metadata of the current default partition is generated to indicate that records of the table in which the value of the partitioning column is in a range between and including the minimum and maximum values are stored in the current partition. Another partition is then allocated for the table at S290.

Accordingly, process 200 continues to execute and create partitions assigned to specific ranges of partitioning column values. New records are typically assigned to a current default partition. However, in a case that a record is received which includes a value of the partitioning column which is within a min-max range of a former default partition, the record is stored in this former default partition. Accordingly, storage of a record at S250 may include a determination of the partition in which to store the record, based on the value of the partitioning column of the record.

According to some embodiments, timer 116 also operates to drop old partitions according to a predetermined schedule or other criteria. Since each subsequently-created partition usually holds newer records than previously-created partitions, deleting older records may simply require de-allocation of the older partitions.

Dropping a partition may include deleting range-specifying metadata for the partition. For example, it is assumed that the table metadata current specifies ranges for three partitions as: "RANGE 1-10, 10-20, 20-26, *". If the second partition is dropped, the metadata may be changed to "RANGE 1-20, 20-26, *". This change may be desirable to simply removing the middle range (i.e., "RANGE 1-10, 20-26, *"), because it allows the system to accommodate insertion of records which include values in the middle range. In this example the left-hand (i.e., "1-10") partition was re-interpreted in order to avoid gaps. Other approaches may be used to avoid gaps, including solutions for the first partition.

Some embodiments of the foregoing may thereby provide dynamic partitioning to database applications, eliminating a need for the database applications to perform this function. For example, a database application simply requests storage of a record in a particular table, and the database system controls partitioning and storage of the record in an appropriate partition as described above.

Figure 9:
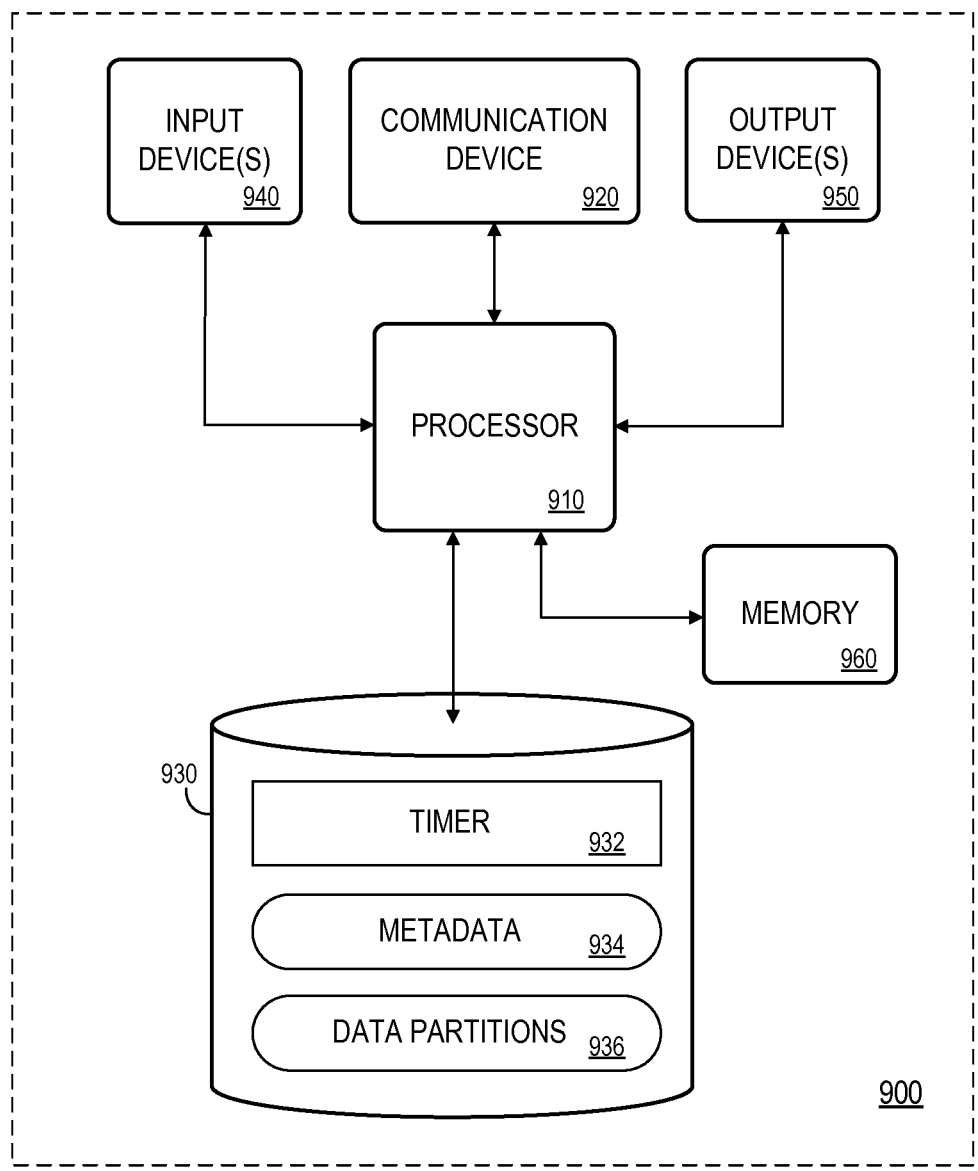
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of database system 110. Apparatus 900 may include other unshown elements according to some embodiments.

Apparatus 900 includes processor 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Timer 932 may comprise program code executed by processor 910 to cause apparatus 900 to perform any one or more of the processes described herein. Embodiments are not limited to execution of these processes by a single apparatus. Metadata 934 and data partitions 936 may comprise metadata and data partitions, respectively, as described above. Data storage device 930 may also store data and other program code needed for providing database functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 or system 400 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
 a data storage device storing a database table;
 a computing device comprising:
  a memory storing processor-executable program code; and
  a processor to execute the processor-executable program code in order to cause the computing device to:
  generate a definition of a table including a partitioning column of the table and a threshold size;
  allocate a first default memory partition for the table;
  store a plurality of records of the table in the first memory partition wherein each of the plurality of records is associated with a respective monotonously-growing value that is stored in the partitioning column;

determine that a size of the records of the table in the first memory partition is greater than the threshold size;

in response to the determination that the size of the records of the table in the first default memory partition is greater than the threshold size, (i) determine a maximum value of the respective monotonously-growing value of the partitioning column in the records of the table in the first memory partition, (ii) determine a minimum value of the respective monotonously-growing value of the partitioning column in the records of the table in the first memory partition, (iii) generate metadata indicating that records of the table in which the value of the partitioning column is in a range between and including the minimum value and the maximum value are stored in the first default memory partition, and (iv) allocate a second default memory partition for the table;

after allocation of the second default memory partition for the table, receiving a new record that includes a value of the partitioning column that is between the maximum value and the minimum value associated with the first default memory partition; and storing the new record in the first default memory partition.

2. A system according to claim 1, wherein the processor is further to execute the processor-executable program code in order to cause the computing device to:

receive a first record to store in the table;

determine that a value of the partitioning column in the first record is not in the range;

store the first record in the second default memory partition; and determine that a size of the records of the table in the second memory partition is not greater than the threshold size.

3. A system according to claim 2, wherein the processor is further to execute the processor-executable program code in order to cause the computing device to:

receive a second record to store in the table;

determine that a value of the partitioning column in the second record is not in the range;

store the second record in the second default memory partition; and determine that a size of the records of the table in the second memory partition is greater than the threshold size; and in response to the determination that the size of the records of the table in the second memory partition is greater than the threshold size, determine a second maximum value of the respective monotonously-growing value of the partitioning column in the records of the table in the second default memory partition;

determine a second minimum value of the respective monotonously-growing value of the partitioning column in the records of the table in the second default memory partition;

generate metadata indicating that records of the table in which the value of the partitioning column is in a second range between and including the second minimum value and the second maximum value are stored in the second default memory partition; and allocate a third default memory partition for the table.

4. A system according to claim 3, wherein the processor is further to execute the processor-executable program code in order to cause the computing device to:

receive a third record to store in the table;

determine that a value of the partitioning column in the third record is not in the range or in the second range;

store the third record in the third default memory partition; and determine that a size of the records of the table in the third memory partition is not greater than the threshold size.

5. A system according to claim 1, wherein the processor is further to execute the processor-executable program code in order to cause the computing device to:

receive a first record to store in the table;

determine that a value of the partitioning column in the first record is in the range; and store the first record in the first default memory partition.

6. A non-transitory computer-readable medium storing program code, the program code executable by a processor of a computing system to cause the computing system to:

generate a definition of a table including a partitioning column of the table and a threshold size;

allocate a first memory partition for the table;

store a plurality of records of the table in the first memory partition wherein each of the plurality of records is associated with a respective monotonously-growing value that is stored in the partitioning column;

determine that a size of the records of the table in the first memory partition is greater than the threshold size; and in response to the determination that the size of the records of the table in the first memory partition is greater than the threshold size, determine a maximum value of the respective monotonously-growing value of the partitioning column in the records of the table in the first memory partition;

determine a minimum value of the respective monotonously-growing value of the partitioning column in the records of the table in the first memory partition;

generate metadata indicating that records of the table in which the value of the partitioning column is in a range between and including the minimum value and the maximum value are stored in the first memory partition;

allocate a second memory partition for the table;

after allocation of the second default memory partition for the table, receiving a new record that includes a value of the partitioning column that is between the maximum value and the minimum value associated with the first default memory partition; and storing the new record in the first default memory partition.

7. A medium according to claim 6, wherein the processor is further to execute the processor-executable program code in order to cause the computing device to:

receive a first record to store in the table;

determine that a value of the partitioning column in the first record is not in the range;

store the first record in the second memory partition; and determine that a size of the records of the table in the second memory partition is not greater than the threshold size.

8. A medium according to claim 7, wherein the processor is further to execute the processor-executable program code in order to cause the computing device to:

receive a second record to store in the table;

determine that a value of the partitioning column in the second record is not in the range;

store the second record in the second memory partition; and determine that a size of the records of the table in the second memory partition is greater than the threshold size; and in response to the determination that the size of the records of the table in the second memory partition is greater than the threshold size, determine a second maximum value of the respective monotonously-growing value of the partitioning column in the records of the table in the second memory partition;

determine a second minimum value of the respective monotonously-growing value of the partitioning column in the records of the table in the second memory partition;

generate metadata indicating that records of the table in which the value of the partitioning column is in a second range between and including the second minimum value and the second maximum value are stored in the second memory partition; and allocate a third memory partition for the table.

9. A medium according to claim 8, wherein the processor is further to execute the processor-executable program code in order to cause the computing device to:

receive a third record to store in the table;

determine that a value of the partitioning column in the third record is not in the range or in the second range;

store the third record in the third memory partition; and determine that a size of the records of the table in the third memory partition is not greater than the threshold size.

10. A medium according to claim 6, wherein the processor is further to execute the processor-executable program code in order to cause the computing device to:

receive a first record to store in the table;

determine that a value of the partitioning column in the first record is in the range; and store the first record in the first memory partition.

11. A computer-implemented method comprising:

generating a definition of a table including a partitioning column of the table and a threshold size;

allocating a first memory partition for the table;

storing a plurality of records of the table in the first memory partition wherein each of the plurality of records is associated with a respective monotonously-growing value that is stored in the partitioning column;

determining that a size of the records of the table in the first memory partition is greater than the threshold size; and in response to the determination that the size of the records of the table in the first memory partition is greater than the threshold size, determining a maximum value of the respective monotonously-growing value of the partitioning column in the records of the table in the first memory partition;

determining a minimum value of the respective monotonously-growing value of the partitioning column in the records of the table in the first memory partition;

generating metadata indicating that records of the table in which the value of the partitioning column is in a range between and including the minimum value and the maximum value are stored in the first memory partition;

allocating a second memory partition for the table;

after allocation of the second default memory partition for the table, receiving a new record that includes a value of the partitioning column that is between the maximum value and the minimum value associated with the first default memory partition; and storing the new record in the first default memory partition.

12. A method according to claim 11, further comprising:

receiving a first record to store in the table;

determining that a value of the partitioning column in the first record is not in the range;

storing the first record in the second memory partition; and determining that a size of the records of the table in the second memory partition is not greater than the threshold size.

13. A method according to claim 12, further comprising:

receiving a second record to store in the table;

determining that a value of the partitioning column in the second record is not in the range;

storing the second record in the second memory partition; and determining that a size of the records of the table in the second memory partition is greater than the threshold size; and in response to the determination that the size of the records of the table in the second memory partition is greater than the threshold size, determining a second maximum value of the respective monotonously-growing value of the partitioning column in the records of the table in the second memory partition;

determining a second minimum value of the respective monotonously-growing value of the partitioning column in the records of the table in the second memory partition;

generating metadata indicating that records of the table in which the value of the partitioning column is in a second range between and including the second minimum value and the second maximum value are stored in the second memory partition; and allocating a third memory partition for the table.

14. A method according to claim 13, further comprising:

receiving a third record to store in the table;

determining that a value of the partitioning column in the third record is not in the range or in the second range;

storing the third record in the third memory partition; and determining that a size of the records of the table in the third memory partition is not greater than the threshold size.

15. A method according to claim 11, further comprising:

receiving a first record to store in the table;

determining that a value of the partitioning column in the first record is in the range; and storing the first record in the first memory partition.

16. The system of claim 1, wherein the threshold size is measured in gigabytes.

17. The system of claim 1, wherein the threshold size is measured in a number of records.

18. The system of claim 1, wherein the monotonously-growing value is a document number.

19. The system of claim 1, wherein the monotonously-growing value is a transaction number.

* * * * *